United States Patent
Harutyunyan et al.

(10) Patent No.: US 9,466,031 B1
(45) Date of Patent: Oct. 11, 2016

(54) DATA-AGNOSTIC METHODS AND SYSTEMS FOR RANKING AND UPDATING BELIEFS

(71) Applicant: VMware, Inc., Palo Alto, CA (US)

(72) Inventors: Ashot Nshan Harutyunyan, Yerevan (AM); Naira Movses Grigoryan, Yerevan (AM); Mazda A. Marvasti, Irivine, CA (US); Arnak Poghosyan, Yerevan (AM); Yanislav Yankov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 267 days.

(21) Appl. No.: 14/104,351

(22) Filed: Dec. 12, 2013

(51) Int. Cl.
*G06N 99/00* (2010.01)
*G06N 5/02* (2006.01)

(52) U.S. Cl.
CPC ............. *G06N 99/005* (2013.01); *G06N 5/02* (2013.01)

(58) Field of Classification Search
CPC ............................. G06N 99/005; G06N 5/02
See application file for complete search history.

(56) References Cited

U.S. PATENT DOCUMENTS

| | | | | |
|---|---|---|---|---|
| 6,041,311 | A * | 3/2000 | Chislenko | G06F 17/30699 705/26.7 |
| 8,447,747 | B1 * | 5/2013 | Yi | G06F 17/30867 707/705 |
| 2010/0088265 | A1 * | 4/2010 | Pohl | G06Q 30/02 706/46 |
| 2012/0102047 | A1 * | 4/2012 | Bjork | G06Q 30/02 707/748 |
| 2014/0108426 | A1 * | 4/2014 | Goldberg | G06Q 10/10 707/748 |

OTHER PUBLICATIONS

Collaborative Filtering with Temporal Dynamincs, by Koren, published 2010.*
A Temporal Item-Based Collaborative Filtering Approach, by Ren, published 2011.*
Collaborative Filtering for Implicit Feedback Datasets, by Hu, published 2008.*
Understanding the Temporal Dynamics of Recommendations across differet Rating Scales, by Vaz, published 2011.*
Alternating Least Squares for Personalized Ranking, by Takacs, published Sep. 2012.*

* cited by examiner

*Primary Examiner* — Stanley K Hill
*Assistant Examiner* — Thomas Fink

(57) ABSTRACT

This disclosure is directed to computational, closed-loop user feedback systems and methods for ranking or updating beliefs for a user based on user feedback. The systems and methods are based on a data-agnostic user feedback formulation that uses user feedback to automatically rank beliefs for a user or update the beliefs. The methods and systems are based on a general statistical inference model, which, in turn, is based on an assumption of convergence in user opinion. The closed-loop user feedback methods and systems may be used to rank or update beliefs prior to inputting the beliefs to a recommender engine. As a result, the recommender engine is expected to be more responsive to customer environments and efficient at deployment and reducing the level of unnecessary user recommendations.

18 Claims, 11 Drawing Sheets

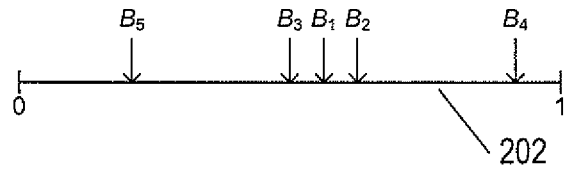
FIG. 2
How satisfied are you with the item?
302 — 306 —
- ○ Extremely satisfied    (1) — 304
- ⦿ Very satisfied    (0.75) — 308
- ○ Moderately satisfied    (0.5)
- ○ Slightly satisfied    (0.25)
- ○ Not satisfied at all    (0)
FIG. 3
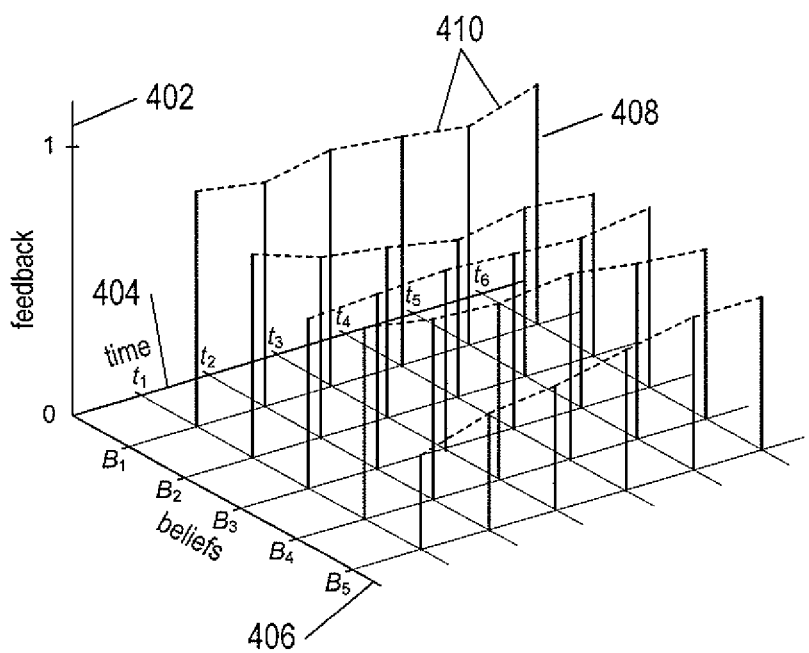
FIG. 4

| time($t_k$) | $B_{2,4}$ | $B_{1,2}$ | $B_{4,3}$ |
|---|---|---|---|
| 1 | 0.9 | 0.7 | 0.5 |
| 2 | 0.2 | 0.8 | 0.1 |
| 3 | 0.4 | 0.9 | 0.2 |
| 6 | 0.5 | 0.85 | 0.1 |
| 8 | 0.95 | 1 | 0.15 |

| k | $S(f_k(B_{2,4}))$ | $S(f_k(B_{1,2}))$ | $S(f_k(B_{4,3}))$ |
|---|---|---|---|
| 1 | 0.9 | 0.7 | 0.5 |
| 2 | 0.38 | 0.77 | 0.2 |
| 3 | 0.395 | 0.858 | 0.2 |
| 4 | 0.49 | 0.85 | 0.12 |
| 5 | 0.89 | 0.959 | 0.146 |

FIG. 12

$$S(f_1(B_{2,4})) = \frac{0.9e^{-(1-1)}}{e^{-(1-1)}} = 0.9$$

$$S(f_2(B_{2,4})) = \frac{0.9e^{-(2-1)} + 0.2e^{-(2-2)}}{e^{-(2-1)} + e^{-(2-2)}} = 0.38$$

$$S(f_3(B_{2,4})) = \frac{0.9e^{-(3-1)} + 0.2e^{-(3-2)} + 0.4e^{-(3-3)}}{e^{-(3-1)} + e^{-(3-2)} + e^{-(3-3)}} = 0.395$$

$$S(f_4(B_{2,4})) = \frac{0.9e^{-(6-1)} + 0.2e^{-(6-2)} + 0.4e^{-(6-3)} + 0.5e^{-(6-6)}}{e^{-(6-1)} + e^{-(6-2)} + e^{-(6-3)} + e^{-(6-6)}} = 0.49$$

$$S(f_5(B_{2,4})) = \frac{0.9e^{-(8-1)} + 0.2e^{-(8-2)} + 0.4e^{-(8-3)} + 0.5e^{-(8-6)} + 0.95e^{-(8-8)}}{e^{-(8-1)} + e^{-(8-2)} + e^{-(8-3)} + e^{-(8-6)} + e^{-(8-8)}} = 0.89$$

FIG. 13

| Title | Author | Year | Conf. | Rank |
|---|---|---|---|---|
| Return of the King | Tolkien | 1955 | 0.81 | 0.99 |
| Harry Potter and the Goblet of Fire | Rowling | 2000 | 0.83 | 0.99 |
| Charlotte's Web | White | 1952 | 0.68 | 0.99 |
| The Little Prince | de Saint-Exupery | 1943 | 0.61 | 0.98 |
| Animal Farm | Orwell | 1945 | 0.54 | 0.96 |
| Lolita | Nabokov | 1955 | 0.55 | 0.96 |

FIG. 15A

| Title | Author | Year | Conf. |
|---|---|---|---|
| Call of the Wild | London | 1903 | 0 |
| Jonathan Livingston Seagull | Bach | 1970 | 0 |
| The Catcher in the Rye | Salinger | 1951 | 0 |
| The reader | Schlink | 1995 | 0 |

FIG. 15B

| Title | Release | Conf. | Rank | IMDB Rating |
|---|---|---|---|---|
| Taxi Driver | 1996 | 0.85 | 1 | 8.5 |
| Tree Colors: Red | 1994 | 1 | 1 | 8 |
| 12 Angry Men | 1957 | 0.65 | 1 | 8.9 |
| Casablanca | 1942 | 0.79 | 1 | 8.7 |
| Pinocchio | 1940 | 0.67 | 1 | 7.6 |
| The Wizard of Oz | 1939 | 0.46 | 0.99 | 8.2 |
| Amedeus | 1984 | 0.61 | 0.97 | 8.4 |
| Godfather | 1972 | 0.61 | 0.92 | 9.2 |
| Schindler's List | 1993 | 0.59 | 0.92 | 8.9 |

FIG. 15C

| Title | Release | Conf. | IMDB Rating |
|---|---|---|---|
| Mighty Aphrodite | 1995 | 0 | 7 |
| The Lion King | 1994 | 0 | 8.4 |
| The Fifth Element | 1997 | 0 | 7.6 |
| Men in Black | 1997 | 0 | 7.2 |
| Toy Story | 1995 | 0 | 8.3 |
| Twelve Monkeys | 1995 | 0 | 8.1 |
| Seven | 1995 | 0 | 8.7 |

FIG. 15D

DATA-AGNOSTIC METHODS AND SYSTEMS FOR RANKING AND UPDATING BELIEFS

TECHNICAL FIELD

The present disclosure is directed to computational systems and methods that utilize data-agnostic user feedback to update or rank beliefs for a user.

BACKGROUND

Users know what they like and dislike about an enterprise's products or services, and users know why they continue to use or purchase services or products offered by an enterprise. A user can be any individual or organization that uses or purchases services, items, or products offered for use or sale by an enterprise. Enterprises refer to the knowledge of how a user perceives the services, items, or products they provide as user feedback. User feedback regarding certain services or products can be obtained directly from a user's answers to survey questions or user feedback can be gleaned indirectly by tracking a user's behavior. Enterprises recognize that incorporation of user feedback may greatly enhance an enterprise's understanding of user challenges and amplify the ability of an enterprise to target services or products to particular users. As a result, most enterprises that sell services or products, consider collecting and assessing user feedback to be a crucial aspect of increasing sales by developing and targeting services or products to individual users. Enterprises typically use computational recommender engines in an attempt to predict a user's preference for a particular service, item, or product. However, typical recommender engines target only optimal personalized recommendation generation for a network of diverse users in item/social element preferences based on the user's common past behavioral patterns or on the service, item, or product characteristics in order to recommend services, items, or products with similar properties. Enterprises and other entities that offer services or products to users continue to seek efficient and reliable input to recommendation engines in order to better assess user feedback and predict user preferences for the services or products they offer to users.

SUMMARY

This disclosure is directed to computational, closed-loop user feedback systems and methods for ranking or updating beliefs for a user based on user feedback. A belief may be characterized by a statement, truth, law, or expert knowledge about any service or product in use or used by a user, or any of these statements, truths, laws, or expert knowledge learned data-agnostically before incorporation of user feedback or after when updated. The systems and methods are based on a data-agnostic user feedback formulation that uses user feedback to automatically rank beliefs for a user or update the beliefs so that the ranked or updated beliefs may be input to any recommender engine. The ranked or updated beliefs enable any recommender engine to output user recommendations that are targeted to user interest and preferences. Specifically, the methods and systems may be used for products that contain recommending modules functioning on data-learned or prior beliefs at customer environments. The methods and systems are based on a general statistical inference model, which, in turn, is based on an assumption of convergence in user opinion. By using the closed-loop user feedback methods and systems to rank or update beliefs for the user prior to inputting the beliefs to a recommender engine, the recommender engine is more responsive to customer environments and efficient at deployment and reducing the level of unnecessary user recommendations.

DESCRIPTION OF THE DRAWINGS

FIG. 2 shows an example interval with beliefs.
FIG. 3 shows an example of a survey question used obtain a user's level of satisfaction.
FIG. 4 shows a plot of feedback statistics for fives beliefs measured at six different times.
FIG. 12 shows a table weighted statistics associated with the user feedback shown in FIG. 11.
FIG. 13 shows mathematical calculation of weighted statistic values one column the table shown in FIG. 12.
FIGS. 15A-15D show tables of confidences and rankings of books and films obtained using the closed-loop feedback methods.

DETAILED DESCRIPTION

This disclosure presents computational systems and methods for updating or ranking beliefs for a user prior to inputting the beliefs to a recommender engine. A belief may be characterized by a statement, truth, law, or expert knowledge about any service or product in use or used by a user, or any of these statements, truths, laws, or expert knowledge learned data agnostically before incorporation of user feedback or after when updated. The recommender engine can be any recommendation generation system or apparatus used by an enterprise to target additional services or products to a user. The systems and methods are based on a data-agnostic, closed-loop user-feedback formulation in which user feedback is used to automatically update or rank the beliefs.

It should be noted, at the onset, that the currently disclosed computational methods and systems for closed-loop user-feedback ranking or updating beliefs for a user are directed to real, tangible, physical systems and the methods carried out within physical systems, including client computers and server computers. Those familiar with modern science and technology well appreciate that, in modern computer systems and other processor-controlled devices and systems, the control components are often fully or partially implemented as sequences of computer instructions that are stored in one or more electronic memories and, in many cases, also in one or more mass-storage devices, and which are executed by one or more processors. As a result of their execution, a processor-controlled device or system carries out various operations, generally at many different levels within the device or system, according to control logic implemented in the stored and executed computer instructions. Computer-instruction-implemented control components of modern processor-controlled devices and systems are as tangible and physical as any other component of the system, including power supplies, cooling fans, electronic memories and processors, and other such physical components.

Figure 1:
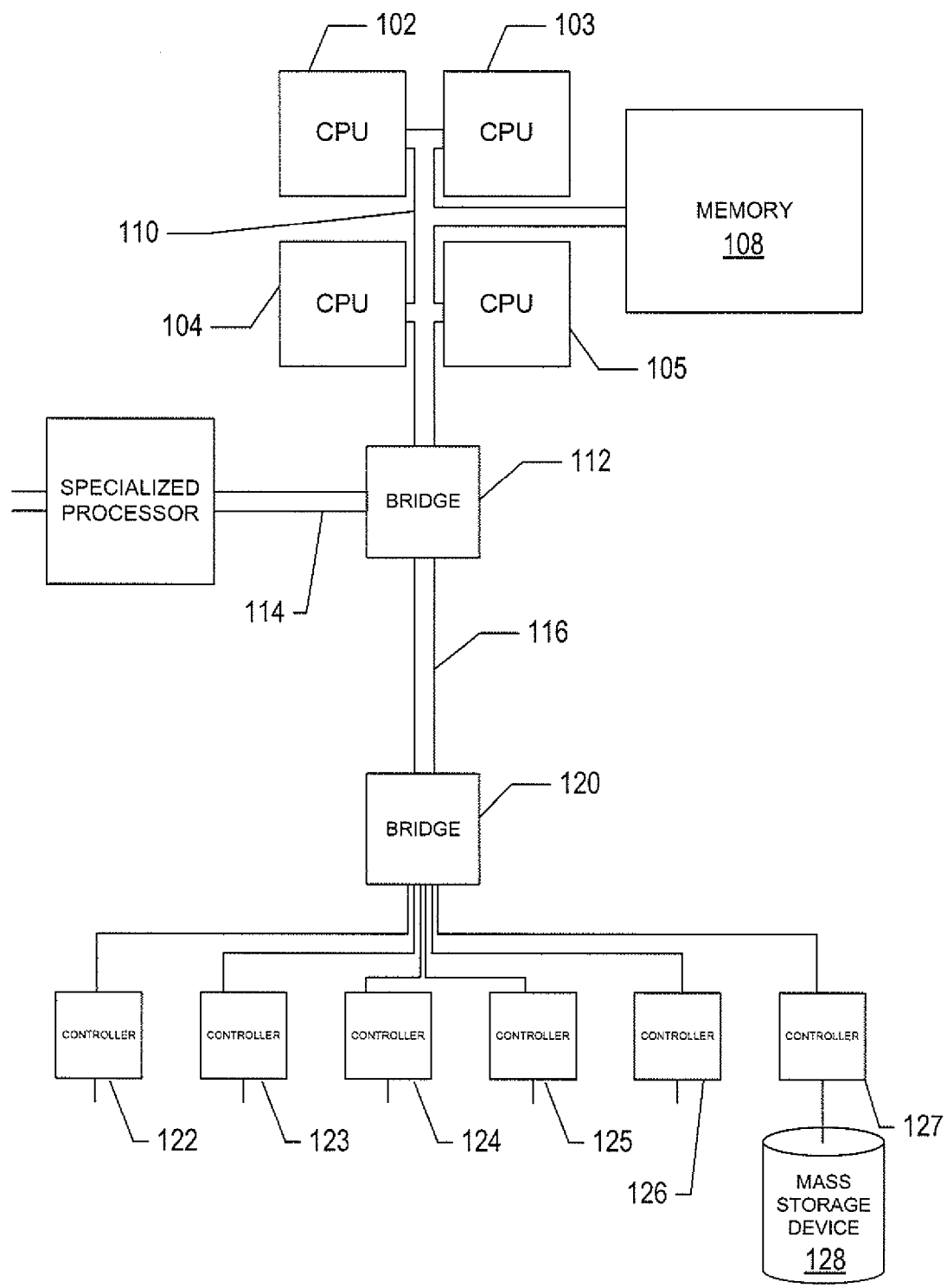
FIG. 1 shows a general architectural diagram for various types of computers.

FIG. 1 provides a general architectural diagram for various types of computers. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. The busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of computer-readable media, such as computer-readable medium 128, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 128 is a data-storage device, including electronic memory, optical or magnetic disk drive, USB drive, flash memory and other such data-storage devices. The computer-readable medium 128 can be used to store machine-readable instructions that encode the computational methods described below and can be used to store encoded data, during store operations, and from which encoded data can be retrieved, during read operations, by computer systems, data-storage systems, and peripheral devices.

Data-Agnostic Closed-Loop Feedback Methods for Ranking or Updating Beliefs

Begin by assuming a set of beliefs have been collected from data representing a system at the user. In a data-agnostic management approach of systems, beliefs are applied directly without user experience or expertise of direct or indirect feedback consideration.

Let $$B=\{B_1, B_2, \ldots, B_n\} \quad (1)$$

be an initial set of n beliefs associated with a user. Each belief $B_i$ in the set of beliefs B represents a statement, truth, law, or expert knowledge about any service or product in use by a user or any statement, truth, law, or expert knowledge learned data agnostically about any service or product in use by a user. A belief may also, in certain situations, be represented by a probability. For example, each belief $B_i$ may be a value in the interval [0,1] (i.e., $0 \leq B_i \leq 1$) with "1" representing a maximum confidence in a statement, truth, law, or expert knowledge about any service or product in use by the user.

FIG. 2 shows an example of an interval between 0 and 1 represented by a line 202. Directional arrows points to values of five beliefs $B_1$, $B_2$, $B_3$, $B_4$, and $B_5$ in the interval [0,1], which indicate preferences a user has for five different services, items, or products offered by an enterprise. In particular, the belief $B_5$ represents a low probability the user will prefer the 5th service, item, or product offered by the enterprise, and the belief $B_4$ represents a high probability the same user will prefer the 4th service, item, or product offered by the enterprise.

Let $$\{f_1(B_i), f_2(B_i), \ldots, f_K(B_i)\} \quad (2)$$

be a set of feedback statistics on the belief $B_i$, where K is an integer number of feedback statistics, $f_k(B_i)$, on the belief $B_i$. Each feedback statistic $f_k(B_i)$ in the set of feedback statistics corresponds to a value in the interval [0,1]. Feedback statistics regarding a belief can be directly or indirectly collected. Direct collection of feedback statistics may be obtained using a survey in which a user's answers to survey question(s) may be translated into a feedback statistic in the interval [0,1].

FIG. 3 shows an example of a survey question that may be asked to obtain a user's level of satisfaction with a particular item provided by an enterprise to the user. The user is presented with a survey question "How satisfied are you with the item?" The user may then select one of the five answers 302 that indicate the user's level of satisfaction. The five answers 302 are associated with feedback statistics 304 represented by numerical values in parentheses that lie in the interval [0,1]. For example, the user has filled in the bubble 306 which indicates that the user is "very satisfied" with the item provided by the enterprise and, in turn, corresponds to a feedback statistic 0.75 308. For this particular example, the feedback statistic has a feedback resolution of five, which corresponds to the number of ways the user may express a level of satisfaction. The "like/dislike" feedback survey represents the most extreme case in collecting user feedback because there are only two ways a user may indicate their level of satisfaction. In this case, the feedback resolution is two with no intermediate values that may used to indicate varying degrees of user satisfaction.

Alternatively, indirect collection of feedback statistics may be obtained by tracking a user's activities over time as these activities relate to specific beliefs. Any indirect feedback that can be tracked over time may also be translated to the interval [0,1]. For example, the number of times a user selects particular services offered by an enterprise may be counted and normalized to determine the feedback statistic for each service.

In the following description, the feedback statistics are processed in order to calculate a confidence, $C(B_i)$, associated with each belief $B_i$. The confidence associated with each belief is then used to calculate a rank, $R(B_i)$, for each belief. The rank associated with each belief enables the beliefs to be placed or listed in rank order. The ranked beliefs may then be used to adjust basic data-agnostic usage of the beliefs. For example, beliefs with very low confidences or ranks may be removed from the set of beliefs or used with low "weight" when formulating a recommendation based on the belief.

It should be noted that the feedback statistics for different beliefs are independent of each other. An extension of this concept accounts for correlated feedback statistics regarding different beliefs.

Now consider a collection of feedback statistics associated with a belief $B_i$ collected over time to form set of time-dependent feedback statistics denoted by $$F(B_i) \equiv \{f(t_k, B_i)\}_{k=1}^{K} = \{f_k(B_i)\}_{k=1}^{K} \quad (3)$$

where $f(t_k, B_i)$ represents a level of satisfaction in the interval [0,1] at time $t_k$. In particular, $f(t_k, B_i) = 1$ denotes full satisfaction at time $t_k$ and $f(t_k, B_i) = 0$ denotes complete dissatisfaction at time $t_k$. The set of feedback statistics $F(B_i)$ may represent user feedback in the form of answers to questions regarding the user's degree or level of satisfaction with the recommendation related to the belief $B_i$. Each feedback statistic $f_k(B_i)$ has a value in the interval [0,1] (or quantized to l degrees within the interval) at a different time, $t_k$, when addressing the belief $B_i$.

FIG. 4 shows a plot of feedback statistics associated with fives beliefs measured at six different times. Vertical axis 402 represents feedback statistics $f_k(B_i)$ with values in the interval [0,1]. Axis 404 represents time with six different times denoted by $t_1$, $t_2$, $t_3$, $t_4$, $t_5$, and $t_6$, and axis 406 represents beliefs with five beliefs $B_1$, $B_2$, $B_3$, $B_4$, and $B_5$. Bars extending perpendicular from the time-belief plane present feedback statistics associated with each belief collected at one of the six times. For example, bar 408 represents the feedback statistic $f_6(B_1)$. The varying height of the bars as indicated by dashed lines, such as dashed lines 410, represent how feedback statistics associated with a particular belief may vary with time. For example, the feedback statistic associated with the belief $B_1$ vary over time but the variation does not indicate that the level of satisfaction represented by the feedback statistics is trending up or down. By contrast, the feedback statistics associated with the belief $B_5$ are trending upward over time, which may indicate that the user's level of satisfaction with the belief $B_5$ is increasing over time.

Based on the set of feedback statistics $F(B_i)$ a convergence evaluation in user opinion is made and a confidence value $C(B_i)$ is calculated, which can be incorporated into the existing analysis in order to tune recommendation performance. The confidence value $C(B_i)$ supports the degree of validity of the initial belief $B_i$. The model used to calculate the rank or update beliefs as described below is predicated on three postulates:

1) The posting of feedback statistics is assumed to be a process with increasing degree of importance with respect to time (in particular, an independent and identically distributed process);
2) When there is no convergence in user feedback statistics, the beliefs are not updated;
3) When there is a convergence to some degree of user feedback, the beliefs are updated according to the corresponding calculated confidence value.

The feedback convergence is estimated by processing the feedback statistics with weighted importance based on time and measuring the uncertainty. In other words, if the confidence is low enough, a bias in weighted opinion statistics is estimated. Weighted statistics of a past series of feedback statistics may be calculated at each time instant using:

$$S(f_k(B_i)) = \frac{\sum_{r=1}^{k} w(t_r) f_r(B_i)}{\sum_{r=1}^{k} w(t_r)} \quad (4)$$

where $w(t_r)$ is a weight function.

The weighted statistic values lie within the interval [0,1] (i.e., $0 \le S(f_k(B_i)) \le 1$). The weight function ranges from 0 to 1 over a domain 0 to $t_k$. The weight function is selected to place more weight or influence on feedback statistics collected later in time than on feedback statistics collected earlier in time. In other words, the weight function is selected to give the feedback statistic $f_y(B_i)$ more weight in Equation (4) than the feedback statistic $f_x(B_i)$, where $0 \le t_x < t_y \le t_k$. As a result, the weighted statistic given by Equation (4) is a time-dependent weighted mean of the feedback statistics collected over time between 0 and $t_k$ with more weight placed on feedback statistics collected later in time. An example of a weight function $w(t_r)$ that places more weight on feedback statistics collected later in time is an exponential weight function given by:

$$w(t_r) = \begin{cases} 1 & \text{for } r = k \\ e^{-(t_k - t_r)} & \text{for } r < k \end{cases} \quad (5)$$

Alternatively, another example of a weight function $w(t_r)$ that places more weight on feedback statistics collected later in time is a linear weight function given by:

$$w(t_r) = \frac{1}{t_k} \cdot t_r \quad (6)$$

where $0 \le t_r \le t_k$.

Figure 5:
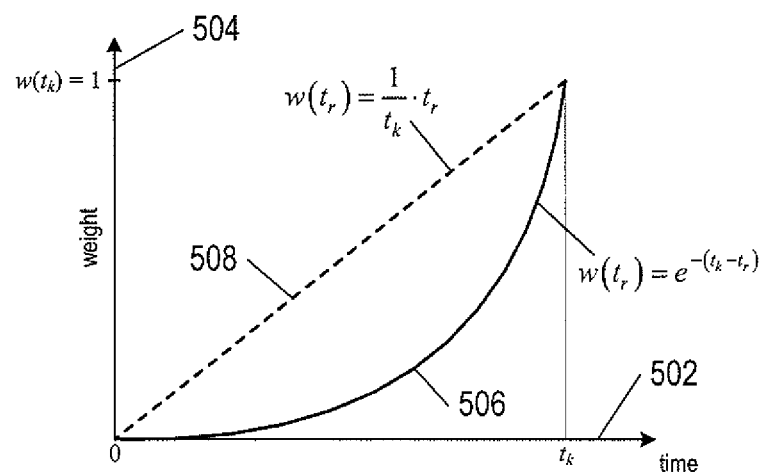
FIG. 5 shows a plot of linear and exponential weight functions.

FIG. 5 shows a plot of the exponential weight function in Equation (5) and a plot of the linear weight function in Equation (6). Horizontal axis 502 represents time $t_r$, and vertical axis 504 represents the value of the weight function $w(t_r)$, which ranges from 0 to 1. Curve 506 represents the exponential function given by Equation (5), and dashed line represents the linear function given by Equation (6). Both weight functions are 0 at time 0 and increase to a value of 1 at time $t_k$. In other words, the weight functions represented by Equations (5) and (6) place more weight on feedback statistics collected later in time than on feedback statistics collected earlier in time with the most current weight $w(t_k)$ having a value of 1.

Let $$\overline{S}(B_i) \equiv \{S(f_1(B_i)), \ldots, S(f_K(B_i))\} \quad (7)$$

be a set of weighted statistics obtained over a time interval from 0 to $t_K$. The weighted statistic values range over the interval [0,1], which is divided into l subintervals. The weighted statistics in the set of weighted statistics $\overline{S}(B_i)$ are binned according to which subinterval of the interval [0,1] the weighted statistics values fall within. The number of subintervals l of the interval [0,1] corresponds to the resolution of the requested feedback statistics. For example, if binary like/dislike user feedback is expected, then l=2 is selected. In this case, the feedback statistics may be 0 or 1 and the interval [0,1] may be partitioned into two subintervals [0,0.5) and [0.5,1]. On the other hand, if 5 possible feedback statistics are expected, then l=5 is selected. In this case, the feedback statistics may be 0, 0.25, 0.5, 0.75, and 1, as described above with reference to the example survey question of FIG. 3, and the interval [0,1] may be partitioned into five subintervals [0,0.20), [0.20,0.40), [0.40,0.60), [0.60,0.80), and [0.80,1]. Note that the subintervals do not have to be of the same length.

Figure 6:
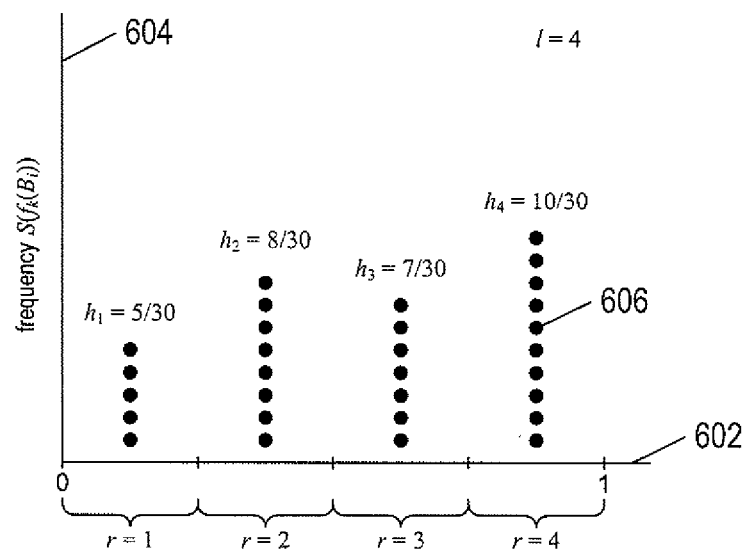
FIG. 6 shows an example histogram for thirty weighted statistics with four subintervals of an interval [0,1].

FIG. 6 shows an example distribution/histogram for 30 weighted statistics binned into four subintervals (i.e., l=4) of the interval [0,1]. Horizontal axis 602 represents the interval [0,1], and vertical axis 604 represents the frequency at which the weighted statistics occur within four subintervals identified by subinterval index r=1, 2, 3, and 4. Solid dots, such as dot 606, represent 30 weighted statistics in a set $\overline{S}(B_i)$ (i.e., K=30) with values that lie within each of the four subintervals. For example, five of the 30 weighted statistic values in the set $\overline{S}(B_i)$ lie within subinterval r=1. The fraction of weighted statistics that lie within each subinterval are normalized frequencies denoted by $h_r$. In other words, in general, $\Sigma_{r=1}^{l} h_r = 1$. The normalized frequencies for each of the subintervals represented in FIG. 6 are given by:

$$\{h_1, h_2, h_3, h_4\} = \left\{\frac{5}{30}, \frac{8}{30}, \frac{7}{30}, \frac{10}{30}\right\}$$

The uncertainty in the weighted statistics of Equation (4) may be determined by calculating the entropy of the normalized frequencies:

$$H(\overline{S}(B_i)) = -\sum_{r=1}^{l} h_r \log_l h_r \qquad (8)$$

where $\Sigma_{r=1}^{l} h_r = 1$.

Note that the entropy calculated according to Equation (8) satisfies the condition $0 \leq H(\overline{S}(B_i)) \leq 1$ Next, confidence in a belief $B_i$ is calculated based on the entropy. When the entropy $H(\overline{S}(B_i))$ is less than or equal to an uncertainty threshold denoted by U (i.e., $H(\overline{S}(B_i)) \leq U$), the uncertainty in the feedback statistics associated with the belief $B_i$ is low and the confidence in the belief $B_i$ may be calculated as a function of the entropy as follows:

$C(B_i) = 1 - H(\overline{S}(B_i))$ \qquad (9)

On the other hand, when the entropy $H(\overline{S}(B_i))$ is greater than the uncertainty threshold U (i.e., $H(\overline{S}(B_i)) > U$), the uncertainty in the feedback statistics associated with the belief $B_i$ is high and the confidence is given by:

$C(B_i) = 0$ \qquad (10)

An example of a suitable value for the uncertainty threshold is:

$$U = -\frac{1}{3} \log_l \frac{1}{3} - \frac{2}{3} \log_l \frac{2}{3} \qquad (11)$$

The uncertainty threshold characterized by Equation (11) corresponds to a histogram of weighted statistics in which l-2 subintervals of the interval [0,1] contain 0 weighted statistics and two other subintervals have $\frac{1}{3}$ and $\frac{2}{3}$ of the weighted statistics, respectively, which is a case of high uncertainty in feedback statistics (i.e. there is no convergence in user opinion) and the corresponding confidence should be the minimum (i.e., $C(B_i) = 0$).

Now let $$m(h_{max}) = \frac{1}{K} \sum_{k=1}^{K} S(f_k(B_i)) \qquad (12)$$

which is the average of the weighted statistics in the set $\overline{S}(B_i)$. Let $h_{max} = \max\{h_1, \ldots, h_l\}$ \qquad (13)

which is the mode of the histogram. In other words, the mode $h_{max}$ of the histogram of the set $\overline{S}(B_i)$ is the largest normalized frequency of weighted statistics and corresponds to the subinterval, called the modal subinterval, with the largest number of weighted statistics. The mode $h_{max}$ takes into account the degree of importance in time of the weighted statistic values that lie within the modal subinterval of the histogram. When the uncertainty $H(\overline{S}(B_i))$ is less than or equal to the uncertainty threshold U (e.g., $U = -\frac{1}{3} \log_l \frac{1}{3} - \frac{2}{3} \log_l \frac{2}{3}$) the confidence $C(B_i)$ is calculated according to Equation (9) by checking which subinterval contains the bias in uncertainty. The subinterval with the largest bias in uncertainty corresponds to the mode of the histogram, $h_{max}$.

Each of the beliefs in the set B in Equation (1) may be ranked according to each belief's associated confidence using $R(B_i) = a + (1-a) \cdot m(h_{max})$ \qquad (14)

where the parameter a is selected as follows:

$$\alpha = \begin{cases} 1 & \text{if } C(B_i) = 0 \\ C(B_i) & \text{if } C(B_i) > 0 \end{cases} \qquad (15)$$

Equation (14) gives a list of beliefs ranked according to associated feedback-based confidences. Another option is to have a sensitivity parameter regulating the selection of a, thus balancing between the prior ranking of the belief and its post-feedback ranking.

Alternatively, for specific applications, updated beliefs may be calculated as a function of the corresponding confidence $C(B_i)$, the original belief $B_i$, and a respective feedback-based belief denoted by $B_i^f$. Each original belief $B_i$ in the set B may be updated by setting a feedback-based belief $B_i^f$ equal to the average $m(h_{max})$ of the weighted statistics in the set $\overline{S}(B_i)$:

$B_i^f = m(h_{max})$ \qquad (16)

A new updated belief is then calculated according to $B'_i = aB_i + (1-a) \cdot B_i^f$ \qquad (17)

where the parameter a is determined as described in Equation (15).

The updated belief $B'_i$ may be used to replace the belief $B_i$ in the set B.

Figure 7:
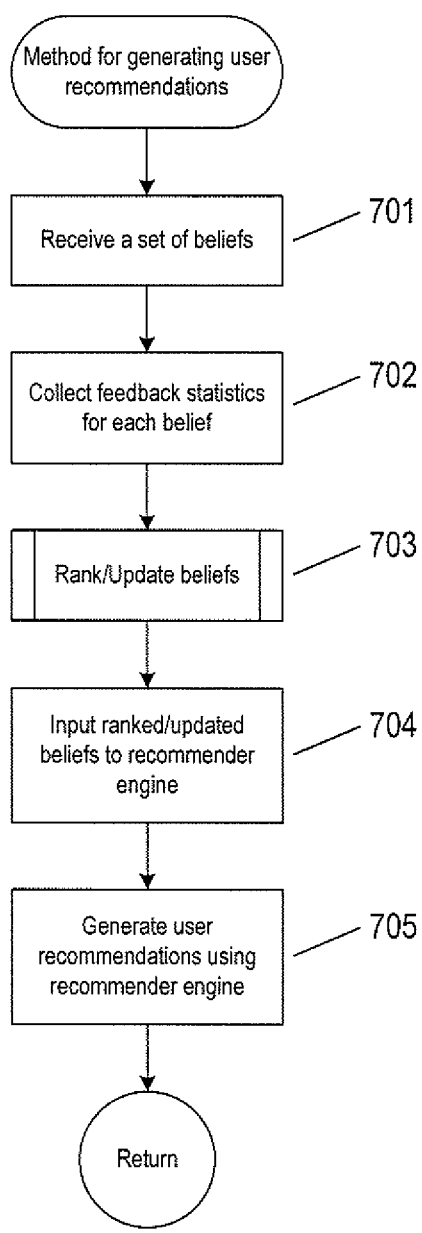
FIG. 7 shows an example of a flow diagram of a computational method in which closed-loop feedback methods for ranking or updating beliefs are used to generate user recommendations.

The ranked or updated beliefs may then be input to a recommender engine that generates targeted user recommendations based on the ranked or updated beliefs. FIG. 7 shows an example of a flow diagram of a computational method in which closed-loop feedback methods for ranking or updating beliefs are used to generate user recommendations. In block 701, a set of beliefs B described above with reference to Equation (1) is received. In block 702, feedback statistics $F(B_i)$ are collected for each of the n beliefs in the set B, as described above with reference to Equations (2) and (3) and FIGS. 3 and 4. In block 703, a routine "rank beliefs" may be called or a routine "update beliefs" may be called depending on whether ranked beliefs are desired or updated beliefs are desired. The routine "rank beliefs" outputs a list of ranked beliefs as described below with reference to FIG. 8, and the routine "update beliefs" outputs an updated set of beliefs as described below with reference to FIG. 9. In block 704, the list of ranked beliefs generated by the routine "rank beliefs," or the set of updated beliefs generated by the routine "update beliefs" is input to a recommender engine. The recommender engine can be any computational recommendation generation system used to recommend targeted services or products to users. In block 705, the recommender engine generates user recommendations based on the ranked beliefs or the updated beliefs received as input.

Figure 8:
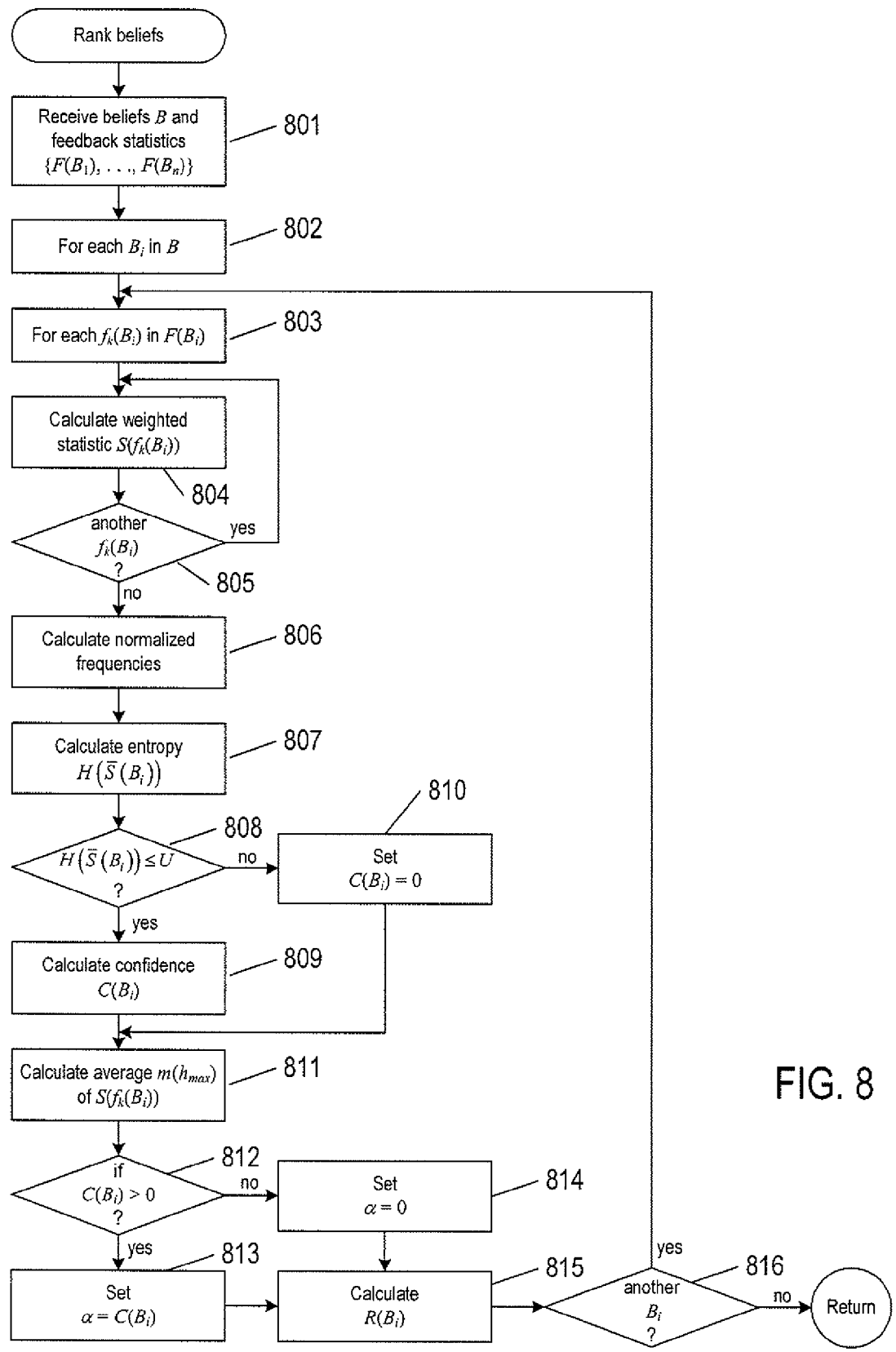
FIG. 8 shows a flow-control diagram of the routine "rank beliefs" called in block 703 of FIG. 7.

FIG. 8 shows a flow-control diagram of the routine "rank beliefs" called in block 703 of FIG. 7. In block 801, a set of n beliefs B and feedback statistics $\{F(B_i)\}_{i+1}^n$ are received. In block 802, a for-loop repeats the computational operations of blocks 803-805 for each of the n beliefs in the set B. In block 803, a for-loop repeats the computational operations of blocks 804 and 805 for each feedback statistic $f_k(B_i)$ in the set of feedback statistics $F(B_i)$ described above with reference to Equation (3). In block 804, a weighted statistic $S(f_k(B_i))$ is calculated. The weighted statistic may be calculated as described above with reference to Equation (4). The weight function used to calculate the weighted statistic places more weight on feedback statistics collected later in time than on feedback statistics collected earlier in time. In block 805, the method repeats the computational operation of block 804 for another feedback statistic in the set $F(B_i)$ until a weighted statistic has been calculated for each of the feedback statistics in the set $F(B_i)$. The weighted statistic calculated according to blocks 804 and 805 form a set of weighted statistics $\bar{S}(B_i)$ as described above with reference to Equation (7). In block 806, normalized frequencies are calculated for the set of weighted statistics based on the resolution l of the feedback statistics, as described above with reference to Equation (7) and FIG. 6. In block 807, the entropy $H(\bar{S}(B_i))$ of the set of weighted statistics is calculated based on the normalized frequencies according to Equation (8). In decision block 808, when the entropy $H(\bar{S}(B_i))$ is less than an uncertainty threshold U, control flows to block 809, otherwise, control flows to block 810. The uncertainty threshold may be the uncertainty threshold given in Equation (11). In block 809, a confidence value $C(B_i)$ may be calculated according to Equation (9) described above. In block 810, the confidence value $C(B_i)$ is set to zero. In block 811, an average $m(h_{max})$ of the weighted statistics in the set $\bar{S}(B_i)$ is calculated according to Equation (12). In block 812, when the confidence value $C(B_i)$ is greater than zero, control flows to block 813, otherwise, control flows to block 814. In block 813, a parameter a is assigned the confidence value $C(B_i)$, and in block 814, the parameter a is assigned the value zero, as described above with reference to Equation (15). In block 815, the parameter a and the average $m(h_{max})$ are used to calculate a rank $R(B_i)$ according to Equation (14). In decision block 816, the method repeats the computational operations of blocks 803-815 for another belief in the set B until a rank has been calculated for each of the beliefs in the set B.

Figure 9:
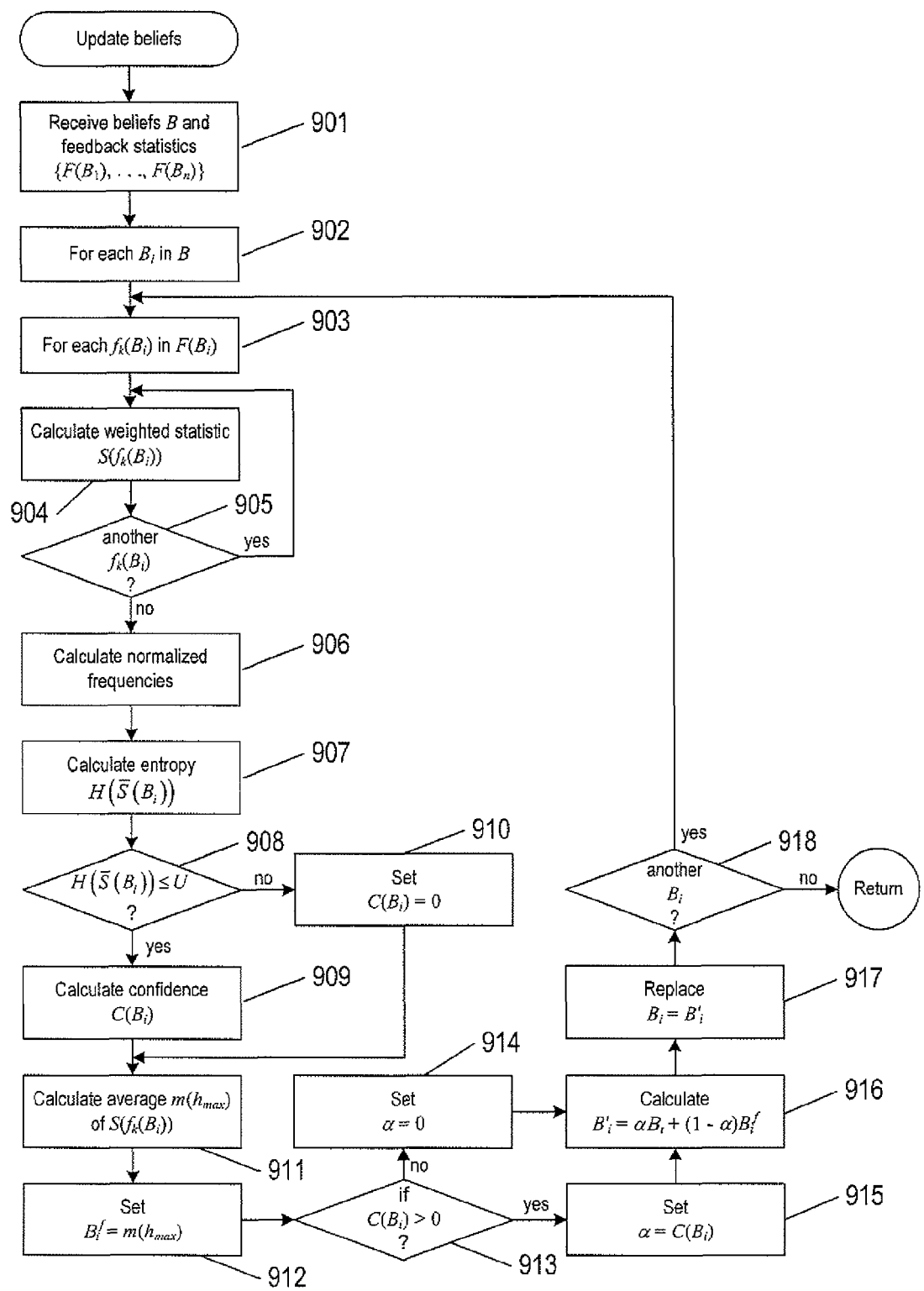
FIG. 9 shows a flow-control diagram of the routine "update beliefs" called in block 703 of FIG. 7.

FIG. 9 shows a flow-control diagram of the routine "update beliefs" called in block 703 of FIG. 7. Blocks 901-911 carry out the same operations as blocks 801-811 of the routine "rank beliefs" described above with reference to FIG. 8. In block 912, a feedback-based belief $B_i^f$ is assigned the value of the average $m(h_{max})$ calculated in block 911, as described above with reference to Equation (16). Blocks 913-915 set the value of the parameter a as described in corresponding blocks 812-814 of FIG. 8. In block 916, an updated belief $B'_i$ is calculated according to Equation (17) based on the parameter a, the current or original belief $B_i$, and the feedback-based belief $B_i^f$. In block 917, the current belief $B_i$ is replaced by the updated belief $B'_i$. In decision block 918, the method repeats the computational operations of blocks 903-917 for another belief in the set B until all of the beliefs have been updated.

Applications

Several areas of applications where the closed-loop feedback methods described above may be incorporated to strengthen an enterprise's capabilities in managing computational services and products are described. For example, the closed-loop feedback methods described above may be using by enterprises that offer data storage and cloud computing services. These enterprises may be data centers with large information technology ("IT") infrastructures and use virtual machines ("VM") to provide data storage and computing services. As a result, having the relevant medium for feedback collection, the enterprise is then able to present prototype results for the customer environments.

1. Root cause detection. The problem of root cause determination is a crucial element in IT infrastructure management products. The recommendations for root cause localization are generated based on beliefs, such as correlations of anomaly event sources, learned from the infrastructure. However, the enterprise does not ask the users whether the recommendation was helpful or what the degree of their satisfaction is. Feeding the mentioned (or any implemented) engine with user feedback at each time point allows for a re-rank of the basic beliefs and balances the beliefs to produce a more effective list of root causes with adjusted likelihoods.

2. Metric space/complexity reduction. Monitoring and surveillance of modern IT infrastructures is a complex task. Currently, techniques for monitoring IT infrastructures use a strategy of applying dimensionality reduction methods, such as applying "principal component analysis," to substantially lower the complexity of computations. This reduction may be pushed further with user feedback rankings against impacts of different metrics or a group of metrics on the whole system. To state simply, the methods described eliminate low weight metrics/groups from the product's analytics engine.

3. False positive alarm reduction. Generation of alarms and alerts of different severity is the cornerstone recommendation instrument that an operations manager applies, such as a VM operations manager. Sometimes the level of false positive alarms is high at specific customer environments. Moreover, the alerts generated by the manager may indicate not only system performance issues but also change indications that may not be of interest to the user. Incorporated feedback statistics processing may help reduce this kind of noise for customers. The corresponding alarm and alert recommendations may be ranked according to the methods described above, which may dramatically change the current state of the product at the costumer's environment. Essentially, this is an application related to problem-oriented alert recommendation generation by feedback-enabled dynamic normalcy bounds analysis for time series data.

4. Log analysis. This is an application related to abnormality detection at cloud environments by fundamental structures extraction in logs files. The method described above is expanded in order to address abnormality detection in log files in the next subsection.

5. Optimized task execution. This is a problem area related to log file analysis, where a user's indirect feedback can be tracked. In particular, facing an error type event the user executes some tasks to remedy the system. This information on relations of various error events and tasks may optimize the execution of those tasks appropriately ranked according to the methods described above as the best priority recommendations.

6. Automatic execution of migration. If a compute cluster is fully automated, VMs that join the cluster on appropriate hosts and migrate running VMs between hosts may be placed on as needed in order to ensure the best possible use of cluster resources. The migration threshold varying from Conservative to Aggressive controls this automatic move based on some best practices or beliefs. Tracking the hosts' behavior (which in this case would be considered the end recipient of the actions) in terms of their responses in migration enables prior beliefs to rank according to the methods described above and makes the migration threshold dynamic suitable for the deployment environment. Another source of feedback information might be employed to revise the DRS affinity rules for placement of VMs on hosts. Namely, the statistics from performance issues at the cluster associated with certain VMs allow ranking the prior affinity rules for VMs. In that way, the original affinity rules would be effective in trade-off with performance of the infrastructure, thus enabling dynamic consideration of modified and new affinity rules.

7. Social-media platform for virtualization management. This application relates to organizing a virtual environment into a social network of its own. This kind of social interaction between humans, hosts, VM's, and servers, is a repository of feedback information that may be turned into knowledge improving social network tools and efficiency of such platforms. Consider, for example, a canonical design where an administrator follows the virtual server, the virtual server in turn follows hosts, and the hosts follow VMs. Processing the like/dislike interaction within this hierarchical tree using the close-loop feedback methods described above may highlight the most unbalanced social links in the network by ranking the links in terms of confidences among users. That will imply recommendations towards improvement of social health with an indication of relevant network sectors to better virtualization management.

Application of Closed-Loop Feedback Methods to Anomaly Detection in Data Logs Files In this subsection, the method described above is applied to data-agnostic analysis concerns that arise in anomaly detection in log files via Dynamic Normalcy Graphs ("DNGs"). The DNG is the log data stream's historical footprint of common probabilistic behavior of event types that result from all possible event sources.

In the following discussion, the methods described above are applied to DNGs. DNGs may be determined according to the methods described in U.S. patent application Ser. No. 13/960,611, filed Aug. 7, 2013 owned by VMWare Inc. In summary, the goal is to enhance the efficiency of the DNG as a causation tool via processing of user feedback statistics on correlation breakage alarms, which may be performed by evaluating the confidences of each correlation (i.e., belief) in a DNG from the statistics and apply it in computation of abnormality degree of a data stream. The result is an update of the conditional probabilities in DNG.

A DNG is a collection of beliefs that correspond to the edges of the DNG. Each belief is represented by a conditional probability $P(i|j)$ from node j to node i, as described in U.S. patent application Ser. No. 13/960,611. In the following discussion, the beliefs (i.e., edges of a DNG) are denoted by $B_{i,j}=P(i|j)$.

A user is asked to answer survey questions regarding the level of the user satisfaction (with resolution l) by abnormality recommendation regarding missing event types which are related to the belief $B_{i,j}$. The user provides feedback statistics with values in the interval [0,1]. For the sake of simplicity, in the following example, it is assumed that the feedback resolution is l=3 and the quantized feedback subintervals of the interval [0,1] are [0,0.25), [0.25, 0.75), and [0.75,1] at each time $t_k$ when facing breakage in the belief $B_{i,j}$. As a result, the feedback statistics for the belief $B_{i,j}$ is given by:

$$F(B_{i,j}) = \{f(t_k, B_{i,j})\}_{k=1}^K = \{f_k(B_{i,j})\}_{k=1}^K$$

where a feedback statistic of 1 corresponds to full satisfaction and 0 corresponds to complete dissatisfaction.

Based on $F(B_{i,j})$ a convergence evaluation in user opinion is made and a confidence $C(B_{i,j})$ is output, which can be incorporated into an existing abnormality analysis to tune the analysis performance (an optimization of false positive alarms). The confidence $C(B_{i,j})$ supports the degree of validity of the initial belief $B_{i,j}$ and leads to a new DNG-based mismatch calculation. In other words, an updated conditional probability $P'(i|j)$ may be obtained as a combination of the original DNG belief $B_{i,j}$ and a belief obtained from feedback processing.

If there is a convergence to some degree of user satisfaction in the recommended beliefs, then the basic conditional probabilities are updated for further usage in anomaly detection with their confidences. The original conditional probabilities may increase or decrease as new beliefs about the system are incorporated. Correspondingly, the role updated conditional probabilities in abnormality (mismatch) computation may change.

The entropy $H(\overline{S}(B_{i,j}))$ is calculated according to Equation (8). In the case of comparably large entropy in which $$1 - \frac{2}{3}\log_3 2 \le H(\overline{S}(B_{i,j})) \le 1$$

there is no convergence in the feedback statistics and hence the system has no update. The uncertainty threshold $1-\frac{2}{3}\log_3 2$ is obtained from Equation (11) for l=3 and corresponds to the case in which the normalized frequencies are $h_1=0$, $h_2=\frac{1}{3}$, and $h_3=\frac{2}{3}$. If the entropy $H(\overline{S}(B_{i,j}))$ is smaller than $1-\frac{2}{3}\log_3 2$, then the confidence $C(B_{i,j})$ is calculated by checking which subinterval contains a largest bias in the uncertainty. The bias is determined by the mode of the histogram $h_{max}=\max\{h_1, h_2, h_3\}$.

Let $m(h_{max})$ be the average of the weighted statistic values $S(f_k(B_{i,j}))$ calculated according to Equation (12) and correspond to the mode $h_{max}$. The confidence of $B_{i,j}$ is determined by the entropy according to $$C(B_{i,j}) = 1 - H(\overline{S}(B_{i,j}))$$

when $$H(\overline{S}(B_{i,j})) < 1 - \frac{2}{3}\log_3 2$$

On the other hand, when $$1 - \frac{2}{3}\log_3 2 \le H(\overline{S}(B_{i,j})) \le 1$$

the confidence in the user feedback is given by $$C(B_{i,j}) = 0$$

According to Equation (16), when the confidence $C(B_{i,j})$ is a positive value, a feedback-based belief is given by:

$$B_{i,j}{}^f = m(h_{max})$$

The feedback-based belief $B_{i,j}{}^f$ also corresponds to a feedback-based conditional probability $P_f(i|j)$. As a result, the feedback-based conditional probability is also given by $$P_f(i|j) = m(h_{max})$$

Using Equation (17) above, the edges, or conditional probabilities, of the DNG can be updated using $$P'(i|j) = aP(i|j) + (1-a) \cdot P_f(i|j)$$

where the parameter a satisfies the conditions given in Equation (15) above.

Experimental Results

Figures 10, 11:
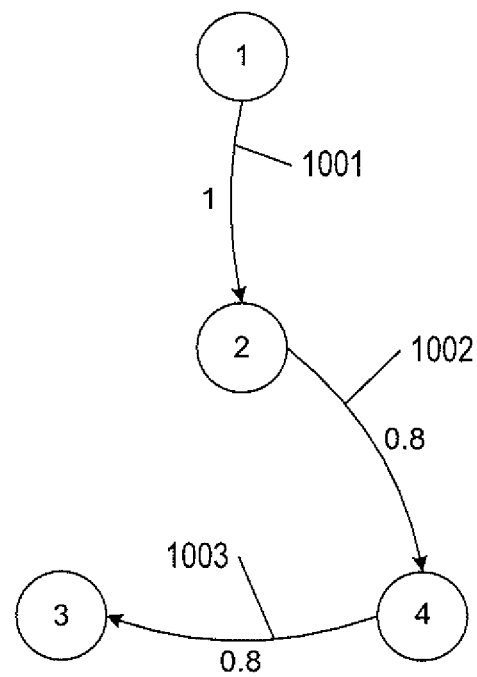
FIG. 10 shows an example dynamic normalcy graph ("DNG").
FIG. 11 shows a table of example user feedback associated with the DNG shown in FIG. 10.

FIG. 10 shows an example of a DNG. In the example of FIG. 10, the edges 1001, 1002, and 1003 represent beliefs that are conditional probabilities given by $B_{1,2}=P(1|2)=1$, $B_{2,4}=P(2|4)=0.8$, and $B_{4,3}=P(4|3)=0.8$, respectively. Calculation of the conditional probabilities depicted as edges in a DNG for log data files is described in U.S. patent application Ser. No. 13/960,611. In this example, user feedback has been obtained and is presented in a user feedback table shown in FIG. 11 at consecutive time instants. For example, the value 0.5 in table entry 1101 represents a feedback statistic $f_1(B_{4,3})=0.5$ and the 0.15 in table entry 1102 represents a feedback statistic $f_8(B_{4,3})=0.5$. FIG. 12 shows a table of weighted statistics of the user-feedback data displayed in the table shown in FIG. 11. The entries in the table of FIG. 12 are calculated using the weighted statistic given by Equation (4) with exponential weight functions given by Equation (5). FIG. 13 illustrates mathematical calculation of the weighted statistic values in column 1202 using Equation (4) with the exponential weight function (5). Using a feedback resolution l=3 and quantized feedback subintervals of the interval [0,1] are [0,0.25), [0.25,0.75), and [0.75,1], the normalized frequencies for the entries in the table of FIG. 12 are given as follows:

For $B_{2,4}$:

$$\{h_1, h_2, h_3\} = \left\{0, \frac{3}{5}, \frac{2}{5}\right\}$$

For $B_{1,2}$:

$$\{h_1, h_2, h_3\} = \left\{0, \frac{1}{5}, \frac{4}{5}\right\}$$

For $B_{4,3}$:

$$\{h_1, h_2, h_3\} = \left\{\frac{4}{5}, \frac{1}{5}, 0\right\}$$

Using Equation (8), the entropies in the feedback statistics for each of the beliefs are $$H(\overline{S}(B_{2,4})) = 0.612$$

$$H(\overline{S}(B_{1,2})) = 0.45$$

$$H(\overline{S}(B_{4,3})) = 0.45$$

Because $H(\overline{S}(B_{2,4})) > 1-\frac{2}{3}\log_3 2 \approx 0.57$, there is a large uncertainty in the feedback statistics $F(B_{2,4})$. As a result, the belief $B_{2,4}$ is not updated. On the other hand, because the entropies $H(\overline{S}(B_{1,2}))$ and $H(\overline{S}(B_{4,3}))$ are both less than $1-\frac{2}{3}\log_3 2 \approx 0.57$, the beliefs $B_{1,2}$ and $B_{4,3}$ may updated as follows: For $B_{1,2}$, an updated belief $B'_{1,2}$, or updated conditional probability $P'(1|2)$, is calculated as follows:

$$h_{max} = \max\left\{0, \frac{1}{5}, \frac{4}{5}\right\} = 0.8$$

$$P^f(1|2) = B_{1,2}{}^f = m(h_{max}) = 0.86$$

$$a = H(\overline{S}(B_{1,2})) = 0.45$$

$$P'(1|2) = B'_{1,2} = aB_{1,2} + (1-a)B_{1,2}{}^f = 0.45 \cdot 1 + 0.55 \cdot 0.86 = 0.923$$

Similarly, for $B_{4,3}$, an updated belief $B'_{4,3}$, or updated conditional probability $P'(4|23)$, is calculated as follows:

$$h_{max} = \max\left\{\frac{4}{5}, \frac{1}{5}, 0\right\} = 0.8$$

$$P^f(4|3) = B_{4,3}{}^f = m(h_{max}) = 0.14$$

$$a = H(\overline{S}(B_{4,3})) = 0.45$$

$$P'(4|3) = B'_{4,3} = aB_{4,3} + (1-a)B_{4,3}{}^f = 0.45 \cdot 0.8 + 0.55 \cdot 0.14 = 0.437$$

Figure 14:
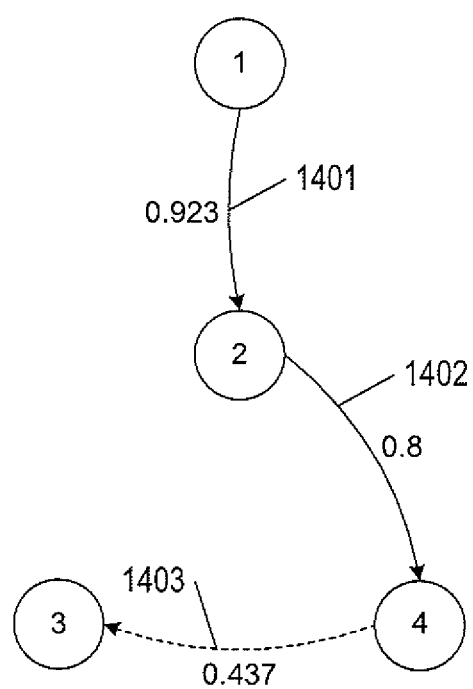
FIG. 14 shows an example of an updated DNG of the DNG shown in FIG. 10.

FIG. 14 shows an example of an updated DNG of the original DNG shown in FIG. 10. Edges 1401-1403 correspond to edges 1001-1003 of the DNG shown in FIG. 10. The edge 1402 corresponds to original edge 1002 which is not updated because $H(\overline{S}(B_{2,4})) > 1-\frac{2}{3}\log_3 2 \approx 0.57$ as explained above. The belief associated with edge 1401 corresponds to original edge 1001 which has decreased even though the feedback is positive but the feedback was not perfect, which corresponds to the original belief of 1. The belief associated with edge 1403 corresponds to original edge 1003 which has decreased to less than 0.5 and may be removed from the updated DNG as indicated by a dashed directional arrow.

The methods described above were also tested on two public databases of consumer ratings for books and films. The results are displayed in four tables shown in FIGS.

15A-15D. In these cases, prior recommendations for items are equally ranked. In other words, all the books and films listed in the tables shown in FIGS. 15A-15D included in initial belief of 1 until user feedback modified this initial assumption. All of the tables include a column of confidences calculated as described above and the tables in FIGS. 15A and 15C include a rank calculated as described above. Note that two categories of item lists were produced, one for items with converged user opinion (positive confidence) and the other with uncertain results. For the uncertainty results, the rank is not shown, and they have the same prior ranks equal to 1 which are represented in the tables of FIGS. 15B and 15D. In the experiments the ratings interval had quantization feedback resolution level of l=3.

For the book ratings in the tables of FIGS. 15A and 15B, the experiment was performed on the book ratings data from http://www.informatik.uni-freiburg.de/-cziegler/BX/. The methods described above received as input 600,000 ratings by 278,859 users on 271,379 books. For the data portion shown in FIGS. 15A and 15B, only the set of books that have been rated at least 30 times were included in the analysis. Note that the ratings time stamps are not available in the dataset. Therefore, the temporal weighting is not applied in this case. The table shown in FIG. 15A shows the three highest ranked books according to the methods above ("Return of the King," "Harry Potter and the Goblet of Fire," and "Charlotte's Web") and three other famous books ("The Little Prince," "Animal Farm," and "Lolita") from the $20^{th}$ century that are of high rank but comparably low in overall feedback confidence. The three other famous books exhibit a larger uncertainty in user feedback, which may be due to the fact that the first three works led to popular films. The table in FIG. 15B shows books by popular authors that exhibit severe disparity in reader opinions. As a result, the uncertainty in reader ratings is so high that these books are within the most disagreeable items in the analysis, although being historically significant.

For the film ratings in the tables shown in FIGS. 15C and 15D, the data was obtained from http://www.grouplens.org/node/73, namely the 100k-MovieLens rating database with 20,000 ratings by 459 users on 1410 movies. The analysis was performed only on the films that have been rated at least 15 times. For comparison, the well-known IMDB rating, which varies from 1 to 10, is provided in the tables. The table shown in FIG. 15C displays some of the highest ranked movies of different eras with distinct confidences. The films listed in the table shown in FIG. 15D are examples of films with high IMDB rated, including Academy award-winning films, but have wildly varying audience opinions, resulting in zero confidence.

Embodiments described above are not intended to be limited to the descriptions above. For example, any number of different computational-processing-method implementations that carry out the methods described above may be designed and developed using various different programming languages and computer platforms and by varying different implementation parameters, including control structures, variables, data structures, modular organization, and other such parameters.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A data-processing system comprising:
one or more processors;
one or more computer-readable media; and
a routine stored in the computer-readable media that when executed on the one or more processors,
receives a set of feedback statistics, each feedback statistic represents a level of user satisfaction with a belief;
calculates weighted statistics of the feedback statistics;
calculates an entropy of the weighted statistics based on frequencies of occurrence of the weighted statistics;
calculates a confidence value for the belief based on the entropy of the weighted statistics associated with the belief;
calculates a rank value for the belief based on the confidence value and an average of the weighted statistics; and
stores the rank value in the one or more computer-readable media.

2. The system of claim 1, wherein the feedback statistics further comprises time-dependent feedback statistics collected over time.

3. The system of claim 1, wherein calculates the weighted statistics further comprises calculates a time-dependent weighted mean of the feedback statistics.

4. The system of claim 3, wherein calculates the weighted statistics further comprises calculates a time-dependent weight function that places more weight on feedback statistics collected later in time that feedback statistics collected early in time.

5. The system of claim 1, wherein calculates the entropy of the weighted statistics further comprises:
calculates normalized frequencies of the weighted statistics occurrences in at least one subinterval of a range of the weighted statistics; and
calculates an entropy of the weighted statistics based on the normalized frequencies.

6. The system of claim 1, wherein determines the confidence value based on the entropy further comprises:
calculates the confidence value as a function of the entropy when the entropy is less than an uncertainty threshold; and
sets the confidence value to zero when the entropy is greater than the uncertainty threshold.

7. A method carried out by a computer system having one or more processors and stored in one or more computer-readable media, the method comprising:
receiving a set of feedback statistics, each feedback statistic represents a level of user satisfaction with a belief;
calculating weighted statistics of the feedback statistics;
calculates an entropy of the weighted statistics based on frequencies of occurrence of the weighted statistics;
calculating a confidence value for the belief based on the entropy of the weighted statistics associated with the belief;
calculating an updated belief based on the confidence value, the belief, and an average of the weighted statistics; and
replacing the belief with the updated belief in the one or more computer-readable media.

8. The method of claim 7, wherein the feedback statistics further comprises time-dependent feedback statistics collected over time.

9. The method of claim 7, wherein calculating the weighted statistics further comprises calculating a time-dependent weighted mean of the feedback statistics.

10. The method of claim 9, wherein calculating the weighted statistics further comprises calculating a time-dependent weight function that places more weight on feedback statistics collected later in time that feedback statistics collected early in time.

11. The method of claim 7, wherein calculating the entropy of the weighted statistics further comprises:
   calculating normalized frequencies of the weighted statistics occurrences in at least one subinterval of a range of the weighted statistics; and
   calculating an entropy of the weighted statistics based on the normalized frequencies.

12. The method of claim 7, wherein determines the confidence value based on the entropy further comprises:
   calculating the confidence value as a function of the entropy when the entropy is less than an uncertainty threshold; and
   setting the confidence value to zero when the entropy is greater than the uncertainty threshold.

13. A computer-readable medium encoded with machine-readable instructions that implement a method carried out by one or more processors of a computer system to perform the operations of
   receiving a set of feedback statistics, each feedback statistic represents a level of user satisfaction with a belief;
   calculating weighted statistics of the feedback statistics;
   calculates an entropy of the weighted statistics based on frequencies of occurrence of the weighted statistics;
   calculating a confidence value for the belief based on the entropy of the weighted statistics associated with the belief;
   calculating a rank value for the belief based on the confidence value and an average of the weighted statistics; and
   storing the rank value in one or more computer-readable media.

14. The medium of claim 13, wherein the feedback statistics further comprises time-dependent feedback statistics collected over time.

15. The medium of claim 13, wherein calculates the weighted statistics further comprises calculating a time-dependent weighted mean of the feedback statistics.

16. The medium of claim 15, wherein calculates the weighted statistics further comprises calculating a time-dependent weight function that places more weight on feedback statistics collected later in time that feedback statistics collected early in time.

17. The medium of claim 13, wherein calculates the entropy of the weighted statistics further comprises:
   calculating normalized frequencies of the weighted statistics occurrences in at least one subinterval of a range of the weighted statistics; and
   calculating an entropy of the weighted statistics based on the normalized frequencies.

18. The medium of claim 13, wherein determines the confidence value based on the entropy further comprises:
   calculating the confidence value as a function of the entropy when the entropy is less than an uncertainty threshold; and
   setting the confidence value to zero when the entropy is greater than the uncertainty threshold.

* * * * *